United States Patent [19]

Koenig

[11] 4,235,761

[45] Nov. 25, 1980

[54] WATER-INSOLUBLE THERMOPLASTIC COMPOSITIONS FOR RIGIDLY HOLDING OR SUPPORTING ARTICLES DURING MACHINING

[75] Inventor: Myron Koenig, Mamaroneck, N.Y.

[73] Assignee: M. Argueso & Co., Inc., Mamaroneck, N.Y.

[21] Appl. No.: 51,434

[22] Filed: Jun. 22, 1979

[51] Int. Cl.$^3$ .............................................. C08L 91/00
[52] U.S. Cl. ..................... 260/28.5 AV; 260/23 AR; 260/28.5 A
[58] Field of Search ..... 260/23 AR, 28.5 A, 28.5 AV

[56] References Cited

U.S. PATENT DOCUMENTS

| | | | |
|---|---|---|---|
| 3,394,095 | 7/1968 | Treacy | 260/28.5 R |
| 3,498,813 | 3/1970 | Treacy | 106/272 |
| 3,799,913 | 3/1974 | Wheeler et al. | 260/28.5 AV |
| 3,911,185 | 10/1975 | Wright, Jr. | 260/28.5 AV |
| 4,012,547 | 3/1977 | Smedberg | 260/28.5 AV |

*Primary Examiner*—Melvyn I. Marquis
*Attorney, Agent, or Firm*—Parmelee, Johnson, Bollinger & Bramblett

[57] ABSTRACT

A water-insoluble thermoplastic composition for rigidly holding and supporting elements or parts during machining comprises a composition of a natural wax, ethylene vinyl acetate copolymer, hydrogenated glyceride and a water-insoluble thermoplastic hydrocarbon resin. The composition may also contain filler materials. Compositions of this invention are characterized by improved adhesion, longer stability, better viscosity control and faster set times.

12 Claims, No Drawings

WATER-INSOLUBLE THERMOPLASTIC COMPOSITIONS FOR RIGIDLY HOLDING OR SUPPORTING ARTICLES DURING MACHINING

FIELD OF THE INVENTION

This invention relates to a water-insoluble, thermoplastic composition which is especially useful in conjunction with the machining of thin walled parts or articles or articles with interrupted cuts and for rigidly holding, supporting or fixturing such articles whereby a rigidly held thin walled part or article is produced for machining or an essentially solid part or article is produced to permit an effectively continuous cut during a machining operation that would otherwise require interrupted cuts.

BACKGROUND OF THE INVENTION

The holding of parts or articles requiring machining, such as turning, cutting, grinding, routing, drilling, milling and the like, particularly when the walls of the part or article to be machined are relatively thin walled or of honeycomb type structure or where the part or article is complex in configuration and interrupted cuts are required or involved, has presented substantial and numerous problems. Also, such problems arise where such parts or articles have open spaces that must be closed during machining to avoid contamination. The machining of such parts or articles may result in chatter, vibration, distoration of the part, fracturing and deflection as well as causing interference with the tool or machine performing the operation. Such adverse actions become particularly troublesome where automatically operated machine tools, such as those controlled by tape, microprocessors or similar means, are being used. In order to be able to produce accurate machinings of such parts or articles they must be held tightly, stabilized, supported and/or fixtured sufficiently so that there is no displacement, deflection, distortion, vibration or fracturing of their walls during the machining operation.

It has heretofore been known to utilize compositions for holding, supporting or stabilizing a wide variety of many different parts or articles during the performance of various machining operations. For example, U.S. Pat. Nos. 3,394,095 and 3,498,813, assigned to the assignee of the present application, disclose and claim compositions for this purpose, which have been successfully used commercially for about a decade. Said patents disclose particulate-filled thermoplastic compositions and their use to rigidize, support or stabilize thin walled or hollow parts or articles or parts and articles involving an interrupted cut by heating such compositions to a molten state, pouring said molten compositions into and/or around such articles before machining so as to produce a rigidly held and supported article or an effectively solid article so that the machining operations can be performed upon the article without damage to the article or in a single operation. Upon completion of the operation the machined part or article is separated from the thermoplastic composition by subjecting them to heat and/or a suitable solvent or vapor degreaser.

Although said compositions have found widespread acceptance and have enjoyed substantial commercial use certain properties of said compositions could benefit by being improved. For example, if the composition were to have a faster set time this would enable the machining operation to have a faster manufacturing cycle time. Additionally a composition of improved adhesiveness would substantially eliminate or reduce shrinkage of the composition away from the part or article during cooling following pouring of the composition in or around the part or article and thereby produce more stability and rigidity for the part or article. Moreover, since said compositions are reusable and are in fact used numerous times any increase in the stability of the composition and any stabilization of the viscosity of the composition would be highly desirable and beneficial.

Furthermore, the compositions described in the two previously mentioned United States patents include 29 to b 39% by weight of a commercially available material sold by Monsanto Chemical Corporation under the trademark "Aroclor 5460" and comprising chlorinated biphenyls and chlorinated polyphenyls. Recently environmentalists, governmental officials and other persons have been seriously questioning and objecting to the use of such polychlorinated biphenyl compositions. And, the United States Environmental Protection Agency acting under the authority of the Toxic Substance Control Act (TSCA) has defined polychlorinated biphenyls, which are specifically banned in TSCA, as being any compound containing more than 50 parts per million of polychlorinated biphenyl.

It is, therefore, highly desirable that water-insoluble, thermoplastic compositions of the type previously described and used be available which do not contain any such polychlorinated biphenyls or other polychlorinated hydrocarbon compounds which are or may become banned. It is even more desirable to be able to find a replacement for such commercially used thermoplastic compositions which are superior in performance and properties than the previously known or used compositions.

SUMMARY OF THE INVENTION

It has now been found, according to this invention, that improved water-insoluble thermoplastic compositions of improved adhesion, longer stability, better viscosity control, and faster set time compared to the prior art patented compositions, are obtained from water-insoluble, thermoplastic compositions comprising about 4 to about 10% by weight of a natural wax, about 2 to about 10% by weight ethylene vinyl acetate copolymer, about 3 to about 8% by weight hydrogenated glyceride, and about 25 to about 80% by weight of a water-insoluble, thermoplastic hydrocarbon resin having a ring and ball softening point (ASTM E-28) of about 85° to 130° C. When it is desired to use a filled, thermoplastic composition there is employed about 40 to about 60% by weight of a filler. The total of the components of the compositions will of course be 100% by weight of the components.

DETAILED DESCRIPTION OF THE INVENTION

It has been found that especially usable and desirable compositions of this invention can be obtained by blending from 4 to 10% by weight, preferable about 5% by weight, of natural waxes, such as carnauba, ouricury, candelilla, beeswax, montan, lignite or Japan wax; from 2 to 10% by weight, preferably about 5% by weight, of ethylene vinyl acetate; from 3 to 8% by weight, preferable about 4% by weight of hydrogenated triglyceride; from 25 to 80% by weight, preferably about 30 to 45% by weight, of a suitable water insoluble thermoplastic hydrocarbon resin having a ring and ball softening point of about 85° to 130° C., preferably between about 95 to 120° C. and, when filled, from 40 to 60% by weight, preferably about 40% by weight, of a filler. Preferably, the filler can comprise 15 to 60% by weight of calcium carbonate, 0 to 20% by weight of glass fiber, from 3 to 10% by weight of aluminum powder and from 1 to 5% by weight of aluminum flake. It is believed that the natural wax acts as a hardening agent and cold flow suppressant. Especially preferred compositions of this invention are those which employ carnauba, ouricury or candelilla wax as the natural wax.

The hydrogenated glyceride is believed to act as a lubricant for the cutting tool. The hydrogenated glyceride may be derived from marine, animal or vegetable oils. Especially preferred for use in the compositions of this invention are hydrogenated glycerides having the following general formula: $C_3H_5(OOC-R)_3$ where R is $-(CH_2)_{12}CH_3$ to $-(CH_2)_{20}CH_3$. An especially preferred hydrogenated glyceride is Ashland Chemical Company's Hydrofol Glyceride T-57.

The ethylene vinyl acetate, when admixed in the compound, complements the adhesive properties of the thermoplastic resin and helps control the viscosity. Preferred as an ethylene vinyl acetate copolymer is one containing between 24.3 to 28.8% vinyl acetate and having a melt index (ASTM D-1238) of 1.7 to 440. An especially preferred ethylene vinyl acetate is E. I. DuPont de Nemours & Co. ethylene vinyl acetate sold under the trademark Elvax 250.

The water-insoluble thermoplastic hydrocarbon resin employed in the compositions of this invention is any suitable thermoplastic hydrocarbon resin having a high degree of adhesive qualities and being hard enough at room temperature to machine. Suitable thermoplastic hydrocarbon resins will have a ring and ball softening point (ASTM E-28) of between about 85° to about 130° C., preferably between about 95° and 120° C. Such resins with softening points below about 85° C. tend to be too soft and gummy at room temperature to be suitable for use in the compositions of this invention.

As examples of suitable water-insoluble thermoplastic hydrocarbon resins useful in the compositions of this invention there may be mentioned, for example, resins prepared by polymerization of dienes and olefins from distillates of cracked petroleum stocks, polymerized resins of mixed olefins, and resins prepared by the catalytic polymerization of streams containing alpha-methyl styrene, indene and vinyl toluene and optionally coumarone and styrene homologues such as those described in U.S. Pat. No. 3,799,913.

Especially preferred in the compositions of this invention there may be mentioned, for example, the following water-insoluble thermoplastic hydrocarbon resins: Eastman hydrocarbon resins H-100, H-115 and H-130 of Eastman Chemical Products, Inc. and produced from petroleum feed stock by polymerization followed by hydrogenation and having a ring and ball softening temperature of between about 100° and 130° C.; Escorez resins containing aliphatic and aromatic structures, particularly Escorez 1511 (also known as Escorez 2101) of Exxon Chemical Company and having an average molecular weight of about 925 and a ring and ball softening point of about 92° C.; Betaprene H-100 hydrocarbon resin of mixed olefins having a ring and ball softening point of about 100° C. and marketed by Reichhold Chemicals, Inc. Eastman hydrocarbon resins H-100, H-115 and H-130 are more fully described in Eastman Chemical Products, Inc. product bulletin publication No. GN-318; Escorez 2101 is more fully described in Exxon Chemical Co. Bulletin R-33; Betaprene H-100 is more fully described in Reichhold Chemicals, Inc. product bulletin 671 (Code 47-280) all of which are incorporated herein by reference thereto. Additionally an especially suitable alpha-methyl styrene, indene, vinyl toluene polymer is that described in example 6 of U.S. Pat. No. 3,799,913, also incorporated herein by reference thereto.

The water-insoluble thermoplastic compositions according to the present invention are characterized by being free of polychlorinated biphenyls or for that matter any chlorinated compounds. The compositions are also characterized by having improved and stronger effective adhesive properties, the viscosity of said compositions are more stable over longer periods of time, are stable over longer periods of time with respect to color and avoidance of brittlement during reuse and possess faster set times when compared to compositions previously used for the purposes of this invention. Additionally, the compositions are generally of lower specific gravity, thereby permitting filling of more parts or articles per pound of thermoplastic composition and the stabilized parts or articles are consequently of less total weight allowing for easier handling.

The compositions of the invention are prepared by mixing and melting the natural wax, hydrogenated glyceride and the thermoplastic resin and raising the temperature of the melt to about 135° C. The ethylene vinyl acetate copolymer is added with stirring, maintaining the temperature at about 135° C. until all the copolymer has melted into the blend. The fillers, when used, are then added and fully dispersed. The composition is then cooled with continuous stirring and poured as cool as possible into containers where it solidifies. If desired the solid composition can be further processed to reduce the solidified composition into pellet, flake or other suitable solid form.

In use the compositions of this invention are used in the same manner as the prior art compositions intended for the same purpose. For example a thermoplastic composition of this invention is heated to a temperature of about 190° to 250° F. to provide a molten form of the composition which is poured at about 200° F. around and/or into a part or article to be machined. The compositions of this invention are useful for holding or stabilizing parts or articles of various metallic and non-metallic materials, such as for example, aluminum, steel, stainless steel, [titanium, high chromium alloys, copper,] ceramic, quartz, fiberglass, glass or plastic parts or articles and the like. After the thermoplastic composition has cooled and solidified around or in the part or article the part or article can be machined as desired. After completion of the machining operation the part or article is cleaned out by melting away the thermoplastic composition by heating with, for example, an oven, radiant heating elements, or quartz heating lamp and/or the use of an appropriate hot aliphatic, aromatic or chlorinated solvent or vapor degreaser, such as for example, trichloroethylene or perchloroethylene solvent. The melted thermoplastic composition is caught in any suitable container and can be reused.

As examples typical of the water-insoluble thermoplastic compositions of the invention the following illustrative exemplary compositions are set forth in which the percentages are all based on the weight of the composition.

EXAMPLE 1

| CARNAUBA WAX | 5% |
|---|---|
| ELVAX 250 | 5% |
| HYDROFOL GLYCERIDE T-57 | 4% |
| BETAPRENE H-100,(Reichhold) | 44% |
| CALCIUM CARBONATE | 42% |
| | 100% |

EXAMPLE 2

| CARNAUBA WAX | 4.6% |
|---|---|
| ELVAX 250 | 4.6% |
| HYDROFOL GLYCERIDE T-57 | 3.7% |
| BETAPRENE H-100 | 40.5% |
| CALCIUM CARBONATE | 38.6% |
| FIBER GLASS | 8.0% |
| | 100% |

EXAMPLE 3

| CARNAUBA WAX | 10% |
|---|---|
| ELVAX 250 | 3% |
| HYDROFOL GLYCERIDE T-57 | 4% |
| ESCOREZ 2101 (Exxon) | 30% |
| CALCIUM CARBONATE | 20% |
| FIBER GLASS | 20% |
| ALUMINUM FLAKE | 9% |
| ALUMINUM POWDER | 4% |
| | 100% |

EXAMPLE 4

| CARNAUBA WAX | 8.7% |
|---|---|
| ELVAX 250 | 7.4% |
| HYDROFOL GLYCERIDE T-57 | 7.4% |
| ESCOREZ 2101 | 76.5% |
| | 100.0% |

EXAMPLE 5

| CARNAUBA WAX | 4% |
|---|---|
| ELVAX 250 | 2% |
| HYDROFOL GLYCERIDE T-57 | 2% |
| ESCOREZ 2101 | 45% |
| CALCIUM CARBONATE | 40% |
| FIBER GLASS | 7% |
| | 100% |

EXAMPLE 6

| BEESWAX | 4% |
|---|---|
| ELVAX 250 | 2% |
| HYDROFOL GLYCERINE T-57 | 2% |
| ESCOREZ 2101 | 45% |
| CALCIUM CARBONATE | 40% |
| FIBER GLASS | 7% |
| | 100% |

EXAMPLE 7

| MONTAN WAX | 4% |
|---|---|
| ELVAX 250 | 2% |
| HYDROFOL GLYCERIDE T-57 | 2% |
| ESCOREZ 2101 | 45% |
| CALCIUM CARBONATE | 40% |
| FIBER GLASS | 7% |
| | 100% |

EXAMPLE 8

| CANDELILLA WAX | 4% |
|---|---|
| ELVAX 250 | 2% |
| HYDROFOL GLYCERIDE T-57 | 2% |
| ESCOREZ 2101 | 45% |
| CALCIUM CARBONATE | 40% |
| FIBER GLASS | 7% |
| | 100% |

EXAMPLE 9

| LIGNITE WAX | 4% |
|---|---|
| ELVAX 250 | 2% |
| HYDROFOL GLYCERIDE T-57 | 2% |
| ESCOREZ 2101 | 45% |
| CALCIUM CARBONATE | 40% |
| FIBER GLASS | 7% |
| | 100% |

EXAMPLE 10

| JAPAN WAX | 4% |
|---|---|
| ELVAX 250 | 2% |
| HYDROFOL GLYCERIDE T-57 | 2% |
| ESCOREZ 2101 | 45% |
| CALCIUM CARBONATE | 40% |
| FIBER GLASS | 7% |
| | 100% |

EXAMPLE 11

| CARNAUBA WAX | 5% |
|---|---|
| ELVAX 250 | 4% |
| HYDROFOL GLYCERIDE T-57 | 4% |
| RESIN, Example 6 of U.S. Pat. No. 3,799,913, softening point 105° C. | 44% |
| CALCIUM CARBONATE | 43% |
| | 100% |

EXAMPLE 12

| CARNAUBA WAX | 5.00% |
|---|---|
| ELVAX 250 | 4.25% |
| HYDROFOL GLYCERIDE T-57 | 4.25% |
| ESCOREZ 2101 | 44.25% |
| CALCIUM CARBONATE | 42.25% |
| | 100.00% |

EXAMPLE 13

| CARNAUBA WAX | 4.60% |
|---|---|

-continued

| | |
|---|---|
| ELVAX 250 | 3.91% |
| HYDROFOL GLYCERIDE T-57 | 3.91% |
| ESCOREZ 2101 | 40.71% |
| CALCIUM CARBONATE | 38.87% |
| FIBER GLASS | 8.00% |
| | 100.00% |

EXAMPLE 14

| | |
|---|---|
| CARNAUBA WAX | 8.7% |
| ELVAX 250 | 7.4% |
| HYDROFOL GLYCERIDE T-57 | 7.4% |
| EASTMAN H 100 | 76.5% |
| | 100.0% |

EXAMPLE 15

| | |
|---|---|
| CARNAUBA WAX | 8.7% |
| ELVAX 250 | 7.4% |
| HYDROFOL GLYCERIDE T-57 | 7.4% |
| EASTMAN H 115 | 76.5% |
| | 100.0% |

EXAMPLE 16

| | |
|---|---|
| CARNAUBA WAX | 8.7% |
| ELVAX 250 | 7.4% |
| HYDROFOL GLYCERIDE T-57 | 7.4% |
| EASTMAN H 130 | 76.5% |
| | 100.0% |

The especially beneficial properties of the compositions of the present invention as compared to the presently used compositions, as disclosed in U.S. Pat. No. 3,394,095, are illustrated when the thermoplastic compositions are subjected to accelerated aging at higher than usual temperatures by stirring the molten compositions at 150° C. over a 28-day test period. Over the twenty-eight day test period compositions of the present invention evidence only minimal change in viscosity, whereas the prior compositions evidence about a 20% change. Additionally, poured test samples from the compositions of the present invention show only slight embrittleness at day 28, whereas the prior compositions show slight embrittlement at day 14 and are quite embrittled at day 28. Additionally, the prior compositions evidence loss of adhesion over the test period, whereas no loss of adhesion is evidence by the compositions of this invention. Illustrative test results for a composition of the present invention, the composition of Example 12 herein, and for a composition of U.S. Pat. No. 3,394,095, namely Example VI therein omitting Glass Fiber, are as follows:

| | Composition of Example 12 | | | |
|---|---|---|---|---|
| Day of Test | 1 | 7 | 14 | 28 |
| Softening Point ASTM E-28 | 77.7° C. | 77.9° C. | 77.9° C. | 77.9° C. |
| Penetration ASTM D-1321 | 3 | 3 | 3 | 3 |
| Viscosity at 121° C., cps | 4000 | 4050 | 4100 | 4100 |
| Adhesion Strength, | Good Good/ | Good Good/ | Good Good/ | Good Good/ |

| | Composition of Example 12 | | | |
|---|---|---|---|---|
| Day of Test | 1 | 7 | 14 | 28 |
| Brittleness | None | None | None | Slight |

| | Prior Art Composition of U. S. Pat. No. 3,394,095 | | | |
|---|---|---|---|---|
| Day of Test | 1 | 7 | 14 | 28 |
| Softening Point ASTM E-28 | 76.7° C. | 76.1° C. | 75.5° C. | 75.0° C. |
| Penetration ASTM D-1321 | 1 | 2 | 2½ | 3 |
| Viscosity at 121° C., cps | 3300 | 3200 | 2800 | 2500 |
| Adhesion Strength, Brittleness | Good Good/ None | Good Good/ None | Fair Good/ Slight | Marginal Fair/ Quite |

In making this comparison, I omitted the Glass Fibers from Example VI of U.S. Pat. No. 3,394,095, in order to provide a comparable composition. I have also compared others of the foregoing Examples with comparable Examples in U.S. Pat. No. 3,394,095, and similar favorable comparisons hold true.

It will be appreciated that the foregoing description and examples of this invention are merely illustrative thereof and that one skilled in the art can make suitable changes in the details thereof without departing from the spirit of the invention and the appended claims.

I claim:

1. A water-insoluble, thermoplastic composition comprising about 4 to about 10% by weight of natural wax, about 2 to about 10% by weight ethylene vinyl acetate copolymer, about 3 to about 8% by weight hydrogenated glyceride, and about 25 about 80% by weight of a water-insoluble, thermoplastic hydrocarbon resin having a ring and ball softening point in the range of about 85° to 130° C.

2. A composition of claim 1 wherein the natural wax is selected from the group consisting of carnauba, ouricury, candelilla, beeswax, montan, lignite, and Japan waxes.

3. A composition according to claim 2 to which has been added about 40 to about 60% by weight of filler material.

4. A composition according to claim 2 wherein the filler material comprises calcium carbonate.

5. A composition according to claim 3 wherein the filler material comprises about 15 to about 60% by weight of calcium carbonate and about 0 to about 20% by weight fiber glass.

6. A composition according to claim 3 wherein the filler material includes about 3 to about 10% by weight aluminum powder and from about 1 to about 5% by weight aluminum flake.

7. A composition according to claim 2 wherein the hydrocarbon resin is a hydrocarbon resin containing aliphatic and aromatic structures and having a softening point of about 92° C. and an average molecular weight of about 925.

8. A composition according to claim 2 wherein the hydrocarbon resin is a hydrocarbon resin of polymerized alpha-methyl styrene, indene and vinyl toluene and having a softening point of about 105° C.

9. A composition according to claim 2 wherein the hydrocarbon resin is a resin of polymerized and hydrogenated petroleum based hydrocarbons and being essentially fully saturated and having a softening point of from about 100° to 130° C.

10. A composition according to claim 2 wherein the hydrocarbon resin is a hydrocarbon resin of polymerized mixed olefins having a softening point of about 100° C.

11. A composition of claim 5 comprising about 5'% by weight carnauba was; 4.25 by weight ethylene vinyl acetate copolymer; about 4.25% by weight hydrogenated glyceride; about 44.24% by weight of a hydrocarbon resin containing aliphatic and aromatic structures having a softening point of about 92° C. and an average molecular weight of about 925; and about 42.25% by weight calcium carbonate.

12. A composition of claim 5 comprising about 4.60% by weight carnauba wax; about 3.91% by weight ethylene vinyl acetate copolymer; about 3.91% by weight hydrogenated glyceride; about 40.71% weight of a hydrocarbon resin containing aliphatic and aromatic structures having a softening point of about 92° C. and an average molecular weight of about 925; about 38.87% by weight calcium carbonate; and about 8% by weight fiber glass.

* * * * *